US009627791B2

(12) United States Patent
Kikuchi et al.

(10) Patent No.: US 9,627,791 B2
(45) Date of Patent: Apr. 18, 2017

(54) CONNECTOR APPARATUS (71) Applicant: Nitta Corporation, Osaka-shi (JP)

(72) Inventors: Hiroki Kikuchi, Yamatokoriyama (JP);
Kenji Tsurimoto, Yamatokoriyama (JP); Hideki Nishio, Yamatokoriyama (JP); Ryosuke Matsumoto, Yamatokoriyama (JP)

(73) Assignee: Nitta Corporation, Osaka-shi (JP)

( * ) Notice: Subject to any disclaimer, the term of this patent is extended or adjusted under 35 U.S.C. 154(b) by 0 days.

(21) Appl. No.: 15/082,414

(22) Filed: Mar. 28, 2016

(65) Prior Publication Data
US 2016/0294092 A1 Oct. 6, 2016

(30) Foreign Application Priority Data

Mar. 31, 2015 (JP) ................................. 2015-074605

(51) Int. Cl.
*H01R 13/28* (2006.01)
*H01R 13/24* (2006.01)
*B25J 15/04* (2006.01)

(52) U.S. Cl.
CPC .......... *H01R 13/2492* (2013.01); *B25J 15/04* (2013.01)

(58) Field of Classification Search
CPC .............................. B25J 15/04; H01R 13/2492
USPC .......................... 439/289, 290, 291, 886, 884
See application file for complete search history.

(56) References Cited

U.S. PATENT DOCUMENTS

| 3,086,188 | A | * | 4/1963 | Ross | H01R 13/28 |
| | | | | | 439/291 |
| 3,440,596 | A | * | 4/1969 | Frompovicz | H01R 13/28 |
| | | | | | 439/290 |
| 4,014,600 | A | * | 3/1977 | Gisewsky | H01R 13/22 |
| | | | | | 439/289 |
| 4,703,986 | A | * | 11/1987 | McCormick | H01R 13/633 |
| | | | | | 439/188 |
| 5,071,363 | A | * | 12/1991 | Reylek | H01R 4/26 |
| | | | | | 439/290 |
| 5,954,520 | A | * | 9/1999 | Schmidt | B60D 1/64 |
| | | | | | 439/289 |

(Continued)

FOREIGN PATENT DOCUMENTS

JP 2009-198238 A 9/2009
JP 2010-038612 A 2/2010

*Primary Examiner* — Abdullah Riyami
*Assistant Examiner* — Nelson R Burgos-Guntin
(74) *Attorney, Agent, or Firm* — Locke Lord LLP (57) ABSTRACT

A connector apparatus which can keep an electrical connection between signal pins in good condition; when a male member and female member are coupled together, first bumps of a first contact portion and second bumps of a second contact portion are brought into contact with each other, electrically connecting the first signal pins and second signal pins with each other. Measures are taken to bring tops and ridge lines of the second bumps into contact with lateral faces of the first bumps. Also, the first signal pins and second signal pins are configured to be pivotable. During connection, contact area is increased by contact between the lateral faces of the first bumps and the tops and ridge lines of the second bumps, causing rubbing between the lateral faces and the tops and ridge lines, and thereby pushing aside and rubbing off sticking spatter, oxide films, contamination, and the like.

5 Claims, 8 Drawing Sheets (56) References Cited

U.S. PATENT DOCUMENTS

| | | | | |
|---|---|---|---|---|
| 6,966,781 B1 * | 11/2005 | Bullinger | ........... | H01R 13/6205 |
| | | | | 439/289 |
| 7,365,280 B2 * | 4/2008 | Nishikawa | ............. | B60Q 1/441 |
| | | | | 200/279 |
| 8,152,549 B1 * | 4/2012 | Werner | ................ | H01R 12/732 |
| | | | | 439/291 |
| 8,764,472 B2 * | 7/2014 | Rassoolkhani | ........ | H01R 13/62 |
| | | | | 439/347 |
| D765,158 S * | 8/2016 | Taniguchi | .................... | D15/138 |
| 2016/0279806 A1 * | 9/2016 | Kikuchi | ............... | B25J 15/0466 |
| 2016/0294092 A1 * | 10/2016 | Kikuchi | ............. | H01R 13/2492 |

* cited by examiner

CONNECTOR APPARATUS

BACKGROUND OF THE INVENTION

Field of the Invention

The present invention relates to a connector apparatus.

Description of the Related Art

A connector apparatus which connects and disconnects a signal line between circuits is known. Such a connector apparatus makes an electrical connection by bringing signal pins into contact with each other and breaks the connection by separating the signal pins from each other. For example, a tool changer applied to an industrial robot uses a connector apparatus which connects and disconnects a signal line interlockingly with coupling and decoupling of a male member mounted on a robot side and a female member mounted on a tool side.

With the tool changer described above, it is necessary to connect and disconnect a signal line used to transmit and receive control signals and the like between circuitry of a control apparatus and the like on the side of a robot body and circuitry contained in the tool. The connector apparatus is made up of first and second connectors attached to a male member and female member, respectively. When the male member and female member are coupled together, the signal pins of the first and second connectors are brought into contact with each other, thereby making an electrical connection, and when the male member and female member are decoupled, the signal pins are brought out of contact with each other. With the tool changer, the signal pins of the connector apparatus are brought into and out of contact with each other repeatedly.

Known examples of connector apparatus such as described above include one in which one or more bumps with a sharp tip are formed on a front end face of one of signal pins and the bumps are butted against a flat front end face of the mating signal pin, thereby making an electrical connection between the signal pins. By butting the bumps against the front end face, films of contamination and the like sticking to the tips of the bumps and the flat front end face are broken, ensuring the electrical connection between the signal pins. Also, to curb increases in electrical resistance by inhibiting formation of an oxide film, generally a metal film resistant to oxidizing is formed on metal surfaces of the signal pins.

A contact probe adapted to connect an IC tester and an IC (semiconductor integrated circuit) is known. The contact probe makes an electrical connection by bringing a tip of the contact probe into contact with a solder ball provided as an external connection terminal of the semiconductor integrated circuit. Known examples of the contact probe include a contact probe in which plural (e.g., nine) square pyramidal bumps are arranged in a matrix on the front end face to ensure contact with the solder ball and a contact probe in which one or more bumps are formed on the front end face as with the connector apparatus described above (see, for example, Japanese Patent Laid-Open Nos. 2009-198238 and 2010-38612).

However, the tool changer may sometimes be used, for example, in an environment in which welding is performed in a neighborhood, and spatter scattered by welding may stick to the signal pins of the separated first and second connectors. The connector apparatus in which bumps on one signal pin are butted against a flat front end face of the other signal pin has a problem in that if spatter sticks to the bumps on the signal pin, the spatter, which is considerably hard, will peel off the metal film on the mating signal pin, deteriorating conditions of the electrical connection between the signal pins.

Also, there is a problem in that the conditions of the electrical connection between the signal pins are not improved because the tips of the bumps on the signal pin are worn with increases in the number of contact times, weakening the effect of breaking films of contamination including oxide films although this is not limited to the connector apparatus used for a tool changer.

SUMMARY OF THE INVENTION

The present invention has been made in view of the above circumstances and has an object to provide a connector apparatus which can keep an electrical connection between signal pins in good condition.

The present invention provides a connector apparatus comprising a first connector having a first signal pin and a second connector having a second signal pin, the connector apparatus being configured to make an electrical connection by bringing tips of the first signal pin and the second signal pin into contact with each other, wherein: the first signal pin has a first contact portion on a front end face, the first contact portion being made up of a plurality of mountain-shaped first bumps arranged two-dimensionally; the second signal pin has a second contact portion on a front end face, the second contact portion being made up of a plurality of mountain-shaped second bumps arranged two-dimensionally; and at least one of the first signal pin and the second signal pin is configured to be pivotable on an axis; and sloped portions of at least either of the first bumps and the second bumps come into contact with either or both of tops and ridge lines of the other of the first bumps and the second bumps.

According to the present invention, a plurality of mountain-shaped first bumps are arrayed two-dimensionally on the front end face of the first signal pin, a plurality of mountain-shaped second bumps are arranged two-dimensionally on the front end face of the second signal pin, at least one of the signal pins is configured to be pivotable on an axis, and sloped portions of at least either of the first bumps and the second bumps come into contact with either or both of tops and ridge lines of the other of the first bumps and the second bumps. This increases contact area and thereby decreases electrical resistance. Also, rubbing occurs between the sloped portions on the bumps of one of the signal pins and the tops or ridge lines on the bumps of the other signal pin, pushing aside or rubbing off spatter, oxide films, contamination, and the like sticking to the first bumps and the second bumps, and thereby keeping the electrical connection between the signal pins in good condition.

DETAILED DESCRIPTION OF THE PREFERRED EMBODIMENTS

Figure 1:
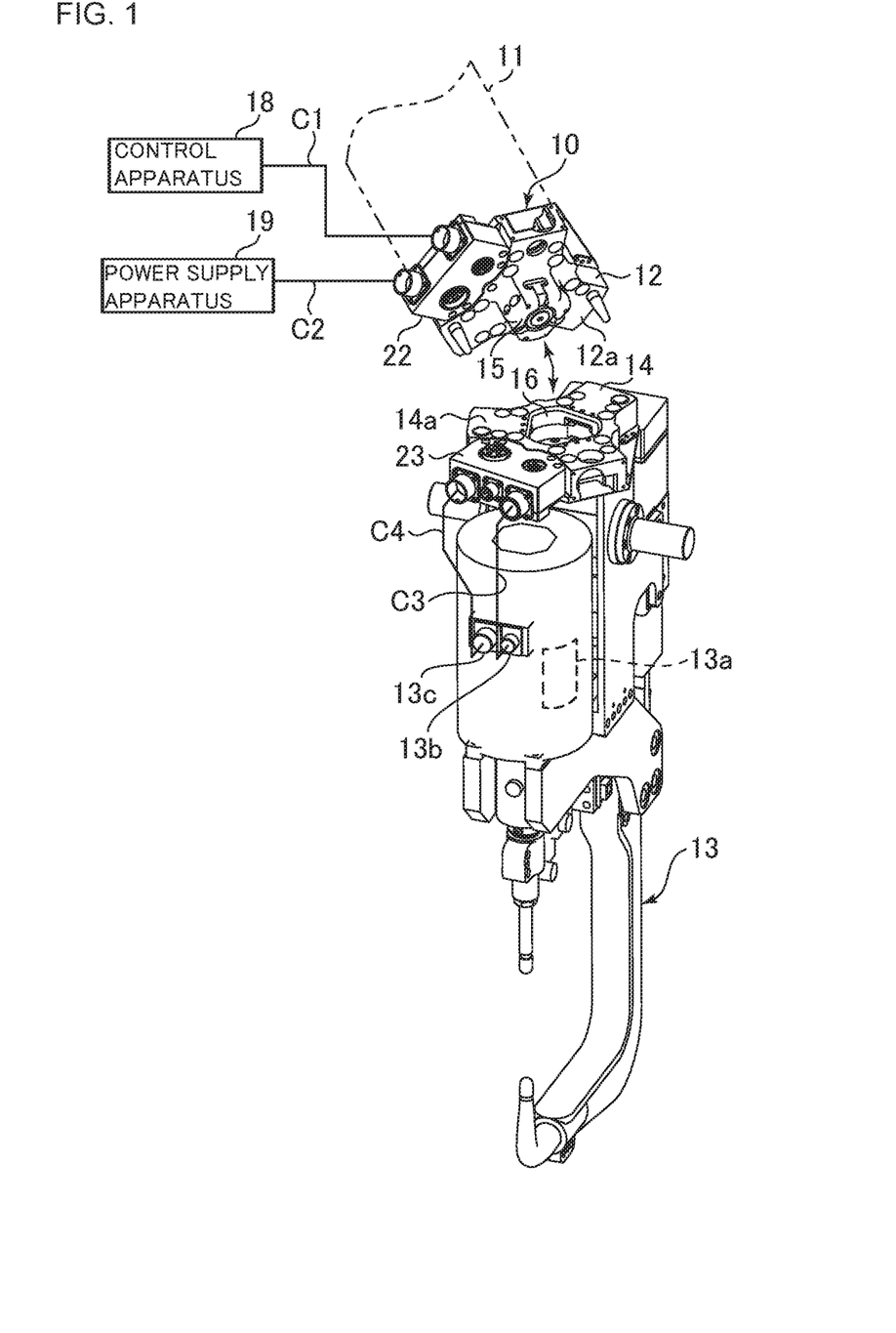
FIG. 1 is a perspective view showing an outline of an industrial robot which uses a connector apparatus according to an embodiment of the present invention.

A tool changer 10 shown in FIG. 1 includes a male member 12 fixed to an end of an arm 11 and a female member 14 fixed to a tool 13, where the arm 11 is a main body of an industrial robot, the male member 12 is a first coupling member, and female member 14 is a second coupling member. The arm 11 and the male member 12 as well as the tool 13 and the female member 14 are detachably fastened together by fasteners such as bolts (not shown). In FIG. 1, a spot welding gun is illustrated as a tool 13, but plural different tools 13 with the female member 14 attached thereto are kept ready for use. The arm 11 and the tool 13 are coupled together via the tool changer 10 and configured to be separable, making the tool 13 interchangeable.

The male member 12 has a protrusion 15 provided at a center of a mounting surface 12a of a main body. The female member 14 has a coupling hole 16 provided in a mounting surface 14a of a main body. To couple the tool 13 to the arm 11, with the mounting surface 12a and mounting surface 14a abutted against each other by moving the arm 11 and with the protrusion 15 inserted in the coupling hole 16, the male member 12 and female member 14 are fixed by operating an engagement mechanism made up of a cam and the like. On the other hand, after deactivating the engagement mechanism, by moving the arm 11 in such a direction as to move the male member 12 away from the female member 14, the tool 13 can be separated from the arm 11.

The male member 12 is equipped with a first signal module 22 connected with a control apparatus 18 and a power supply apparatus 19. Also, the female member 14 is equipped with a second signal module 23 connected to a servomotor unit 13a. The first signal module 22 and second signal module 23 make up a signal repeater.

Along with coupling and decoupling of the arm 11 and the tool 13, i.e., coupling and decoupling of the male member 12 and the female member 14, the first signal module 22 and second signal module 23 are electrically connected and disconnected as described later. As a result of the electrical connection between the signal modules 22 and 23, the servomotor unit 13a of the tool 13 is connected with the control apparatus 18 and the power supply apparatus 19. Consequently, transmission and reception of signals among various circuits are enabled in order to bi-directionally control, for example, a servomotor from the control apparatus 18 and the servomotor unit 13a as well as to enable power supply from the power supply apparatus 19 to the servomotor unit 13a. The control apparatus 18 is a circuit on the side of the male member 12. Circuitry on the side of the male member 12 may be incorporated in an industrial robot or provided separately. The servomotor unit 13a includes the servomotor incorporated in the tool 13 and a drive circuit of the servomotor or circuitry made up of a sensor and the like on the tool side, i.e., on the side of the female member 14.

Figure 2:
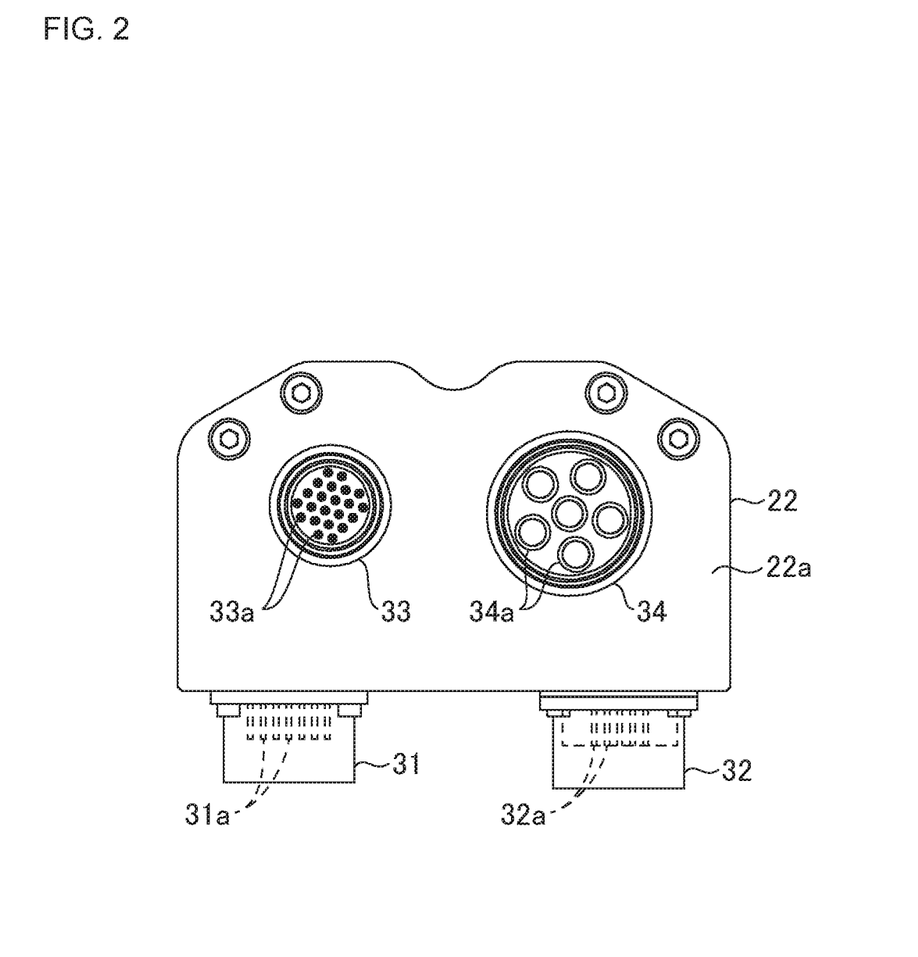
FIG. 2 is an explanatory diagram showing a connection surface of a first signal module.

As shown in FIG. 2, a first circuit side signal connector 31 and a power input connector 32 are provided on a lateral face of the first signal module 22. The first circuit side signal connector 31 is connected with the control apparatus 18 via a cable C1 (see FIG. 1) and the power input connector 32 is connected with the power supply apparatus 19 via a cable C2 (see FIG. 1). Also, the first signal module 22 is provided with an embedded first signal relay connector 33 and a first power relay connector 34 and connection terminal portions of the connectors are revealed on a connection surface 22a. The connection surface 22a faces a same direction as the mounting surface 12a when the first signal module 22 is mounted on the male member 12.

The first signal relay connector 33 serving as a first connector is provided with plural first signal pins 33a. Inside the first signal module 22, the first signal pins 33a are electrically connected to different first signal pins 31a of the first circuit side signal connector 31, respectively. Consequently, the first signal relay connector 33 is kept connected to the control apparatus 18. The numbers of the first signal pins 31a and first signal pins 33a may be determined based on the number of signals necessary for the tool 13, but may be larger than the number of necessary signals.

The first power relay connector 34 is provided with plural power pins 34a, which are electrically connected in the first signal module 22 to respective power pins 32a of the power input connector 32. Consequently, electric power from the power supply apparatus 19 can be supplied through the first power relay connector 34.

Figure 3:
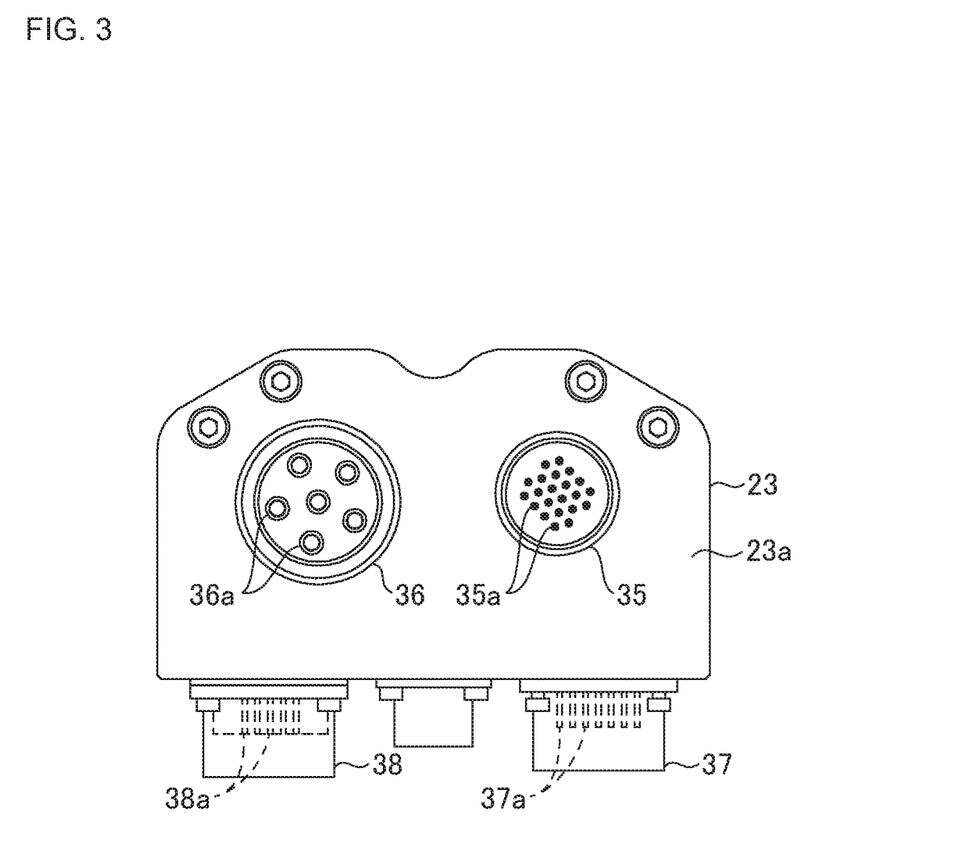
FIG. 3 is an explanatory diagram showing a connection surface of a second signal module.

As shown in FIG. 3, the second signal module 23 is provided with an embedded second signal relay connector 35 and a second power relay connector 36 and connection terminal portions of the connectors are revealed on a connection surface 23a. The connection surface 23a faces a same direction as the mounting surface 14a when the second signal module 23 is mounted on the female member 14. A second circuit side signal connector 37 and a power output connector 38 are provided on a lateral face of the second signal module 23. The second circuit side signal connector 37 and the power output connector 38 are connected to the servomotor unit 13a via cables C3 and C4, respectively, as well as via connectors 13b and 13c of the tool 13, respectively.

The second signal relay connector 35 serving as a second connector is provided with as many second signal pins 35a as there are first signal pins 33a. Inside the second signal module 23, the second signal pins 35a are electrically connected to different signal pins 37a of the second circuit side signal connector 37, respectively. Consequently, the second signal relay connector 35 is kept connected to the servomotor unit 13a.

The second power relay connector 36, which is designed to receive electric power from the first power relay connector 34, is provided with plural power pins 36a connected with the power pins 34a. The power pins 36a are electrically connected in the second signal module 23 to respective power pins 38a of the power output connector 38. Consequently, the electric power received by the second power relay connector 36 is supplied to the servomotor unit 13a.

The first signal relay connector 33 and the second signal relay connector 35 make up a connector apparatus. As the male member 12 and the female member 14 are coupled together, the tips of the first signal pins 33a and the tips of the corresponding second signal pins 35a abut each other, putting the first signal relay connector 33 and the second signal relay connector 35 in a connected state in which the connectors are electrically connected with each other. Consequently, a signal path is formed between the control apparatus 18 and the servomotor unit 13a, allowing signals to be exchanged between circuits. Also, the male member 12 is decoupled from the female member 14, separating the first signal pins 33a and the second signal pins 35a from each other and thereby breaking the connection.

Note that this similarly applies to the first power relay connector 34 and the second power relay connector 36 and that the coupling of the male member 12 and the female member 14 puts the power pins 34*a* and the power pins 36*a* in a connected state in which the pins are connected while the decoupling of the male member 12 and the female member 14 breaks the connection.

Figure 4:
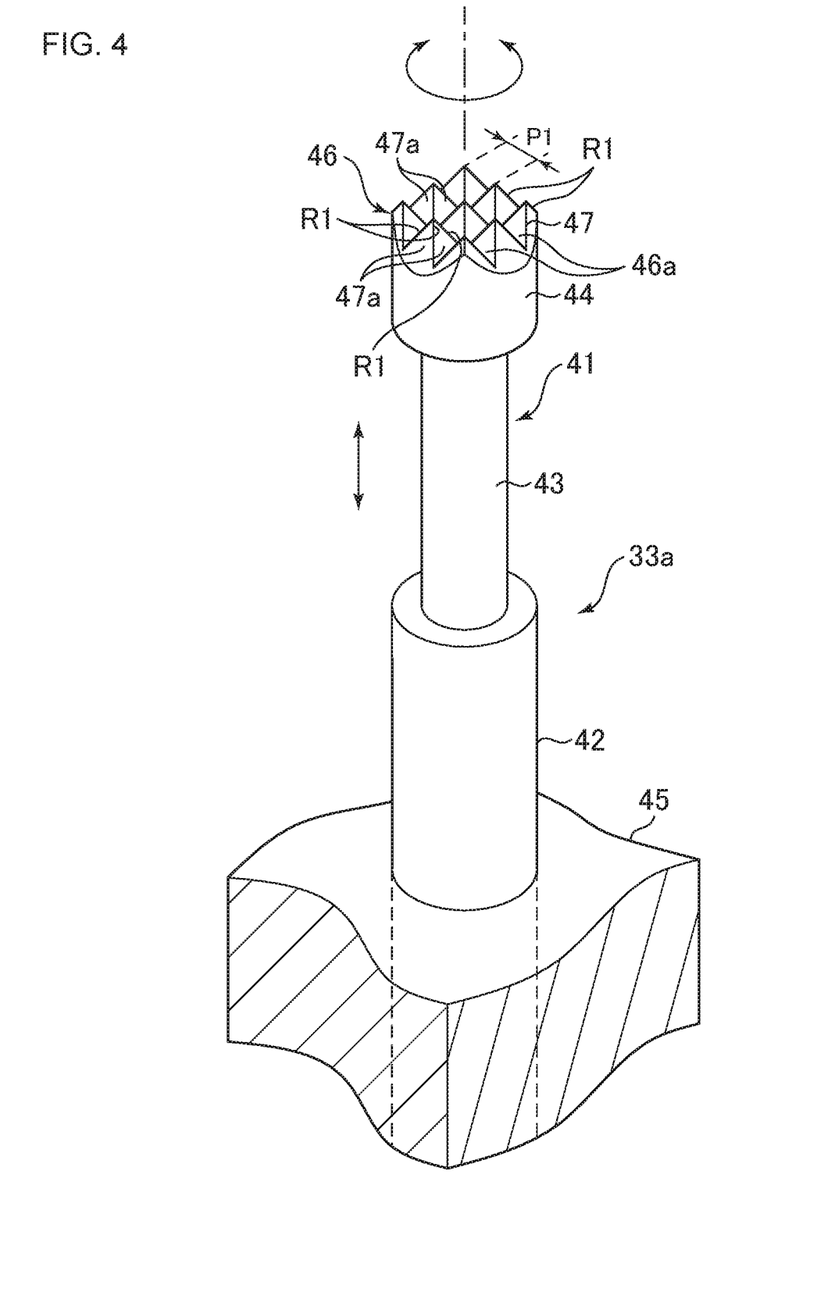
FIG. 4 is a perspective view showing an appearance of a first signal pin of a first signal relay connector.

As shown in FIG. 4, the first signal pin 33*a* includes a pin body 41 and a sleeve 42. The pin body 41 is made up of a shank 43 columnar in shape and a head 44 formed integrally with one end of the shank 43. The head 44 is columnar in shape and larger in diameter than the shank 43. The pin body 41 and the sleeve 42 is made of conductive metal and have a thin metal film formed on a surface by plating or the like. The thin metal film is formed of material, such as gold, excellent in conductivity and resistant to oxidation.

With another end of the shank 43 inserted in the sleeve 42, the pin body 41 is configured to be movable along an axial direction and pivotable on an axis. A spring (not shown) is placed in the sleeve 42, biasing the pin body 41 in such a direction as to jump out of the sleeve 42. The shank 43 has its movement in the sleeve 42 restricted so as not come off the sleeve 42. The first signal pin 33*a* has the sleeve 42 fixed to a holding member 45 of the first signal relay connector 33 so as to reveal a part of the sleeve 42 and the shank 43 as well as the head 44 to the connection surface 22*a*.

A first contact portion 46 is provided on a front end face of the head 44, which is a front end of the first signal pin 33*a*. Nine first bumps 47 are formed on the first contact portion 46. Each of the first bumps 47 is shaped like a mountain with a pointed tip. In this example, the first bump 47 has a square pyramidal shape which has a square base and four lateral faces 47*a* of the same shape. The nine first bumps 47 are arranged two-dimensionally in a 3-row by 3-column matrix. Array pitch of the first bumps 47 is kept constant, being the same in both row and column directions and equal in length to a side of the base of the first bump 47. Therefore, an interval P1 between a pair of adjacent first bumps 47 (interval between tops) is equal to the array pitch. Each pair of adjacent lateral faces 47*a* form a ridge line R1. Also, each pair of adjacent first bumps 47 form a V-shaped groove 46*a* between lateral faces 47*a*. Incidentally, of the first bumps 47 arranged two-dimensionally, the first bumps 47 placed in four corners lack part of a square pyramid, and are not exactly square pyramidal, but this does not present a problem.

Figure 5:
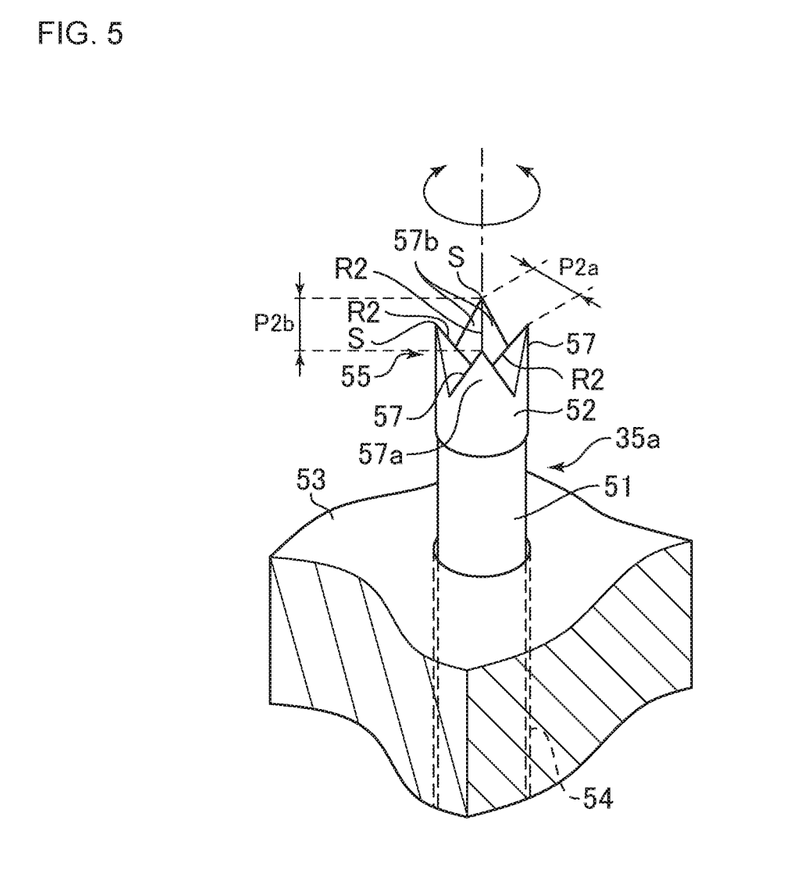
FIG. 5 is a perspective view showing an appearance of a second signal pin of a second signal relay connector.

As shown in FIG. 5, the second signal pin 35*a* is made up of a shank 51 columnar in shape and a head 52 formed integrally with one end of the shank 51. The head 52 is columnar in shape and larger in diameter than the shank 51. As with the first signal pin 33*a*, the second signal pin 35*a* is made of conductive metal and has a thin metal film formed on a surface. The second signal pin 35*a* is pivotably mounted in a mounting pipe 54 embedded in a holding member 53 of the second signal relay connector 35 so as to reveal a part of the shank 51 as well as the head 52 to the connection surface 23*a*. Note that although both the first signal pin 33*a* and the second signal pin 35*a* are pivotable in this example, only one of the pins may be configured to be pivotable.

A second contact portion 55 is provided on a front face of the head 52, which is a front end of the second signal pin 35*a*. The second contact portion 55 has a so-called crown shape made up of four mountain-shaped second bumps 57 with a pointed tip. All the second bumps 57 have a same shape and tops S of the second bumps 57 are arranged two-dimensionally in a 2-row by 2-column matrix, being placed at equal intervals on a circumference centered on an axis of the second signal pin 35*a*. Each of the second bumps 57 is formed into a substantially pyramidal shape having a circumferential surface 57*a* equal in diameter to the head 52 and two lateral faces 57*b*, and a ridge line R2 formed by the two lateral faces 57*b* extends linearly toward a center of the second contact portion 55 from the top S. Each pair of adjacent second bumps 57 form a V-shaped groove between lateral faces 57*a*. Array pitch of the second bumps 57 are the same in both row and column directions and equal to an interval P2*a* between the tops S of a pair of circumferentially adjacent second bumps 57. Also, an interval P2*b* between the second bumps 57 across a center (axis of the second signal pin 35*a*) of the head 52 is set equal to diameter of the head 52.

Figure 6:
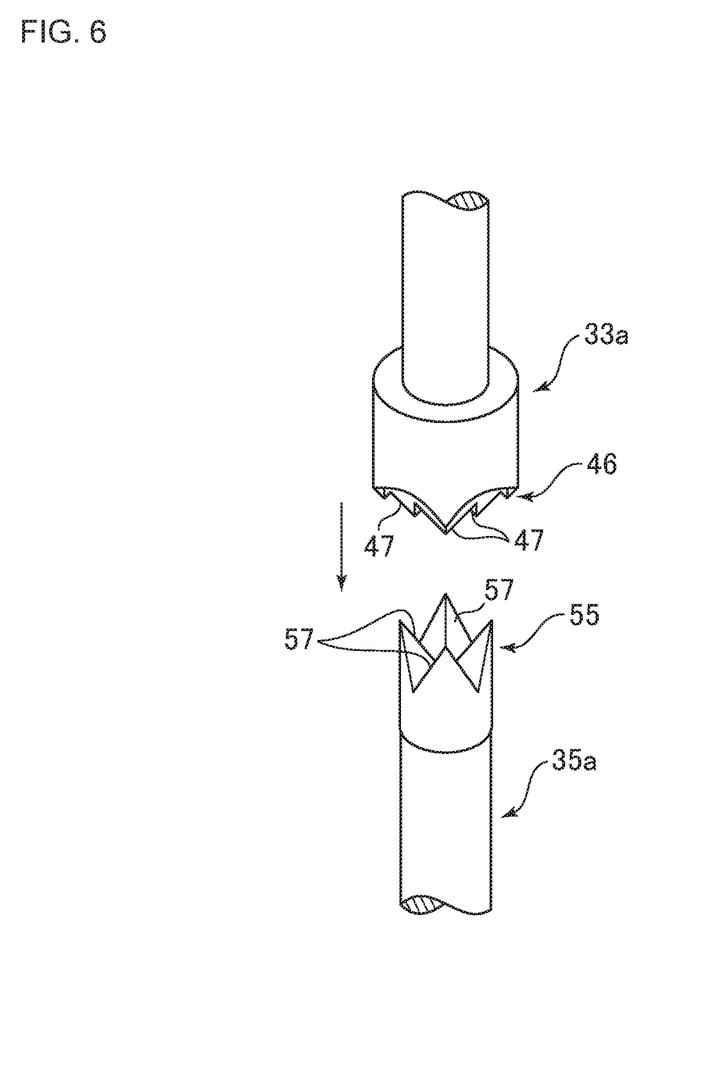
FIG. 6 is a perspective view describing connection of the first signal pin and the second signal pin.

In coupling the male member 12 and the female member 14 together, as shown in FIG. 6, the first signal pins 33*a* move toward the corresponding second signal pins 35*a*, causing the first contact portions 46 to abut the second contact portions 55, bringing the first bumps 47 into contact with the second bumps 57, and thereby electrically connecting the first signal pins 33*a* and the second signal pins 35*a* with each other.

Sloped portions of either of the first bumps 47 and the second bumps 57 are designed to be brought into contact with either or both of the tops and ridge lines of the other of the first bumps 47 and the second bumps 57. In this way, as the sloped portions of either of the bumps are brought into contact with either or both of the tops and ridge lines of the other of the bumps and at least either of the first signal pins 33*a* and the second signal pins 35*a* are made pivotable, electrical connections are kept in good condition. More specifically, by causing rubbing between the sloped portions of one group of bumps and the tops and ridge lines of the other group of bumps, sticking spatter, oxide films, contamination, and the like are designed to be pushed aside and rubbed off. Also, by bringing the sloped portions of one group of bumps into contact with the tops and ridge lines of the other group of bumps, contact area is increased and electrical resistance is decreased. The contact area is increased when the sloped portions of one group of bumps are brought into contact with not only the tops, but also the ridge lines of the other group of bumps or when the ridge lines are worn as a result of rubbing against the sloped portions. Note that the sloped portion of the bump is a surface or ridge line sloped with respect to the axis of the signal pin. In this example, the lateral face 47*a* and ridge line R1 of the first bump 47 or the lateral face 57*b* and ridge line R2 of the second bump 57 can be sloped portions.

In this example, one group of bumps are designated as the first bumps 47 while the other group of bumps are designated as the second bumps 57 and the tops S and ridge lines R2 of the second bumps 57 are configured to come into contact with the lateral faces 47*a* of the first bumps 47. Therefore, the interval P1 between the pair of adjacent first bumps 47 in the first contact portion 46 and interval between the pair of second bumps 57 on the second contact portion 55 are set different from each other and slope angles of the lateral face 47*a* and ridge line R2 are set different from each other. More specifically, the interval P2*b* between the second bumps 57 is set larger than the interval P1 between the first bumps 47. Also, the slope angle of the ridge line R2 is made smaller than the slope angle of the lateral face 47*a*. In so doing, preferably the interval P2*b* between the second bumps 57 is not an integral multiple of the interval P1 between the first bumps 47. When the first bumps 47 are arranged in a 3-row by 3-column matrix as with this example, it is recommended that the interval P2*b* between the second bumps 57 is equal to or smaller than 2.5 times the interval P1 between the first bumps 47. Note that the interval P2*b* between the second bumps 57 may be set smaller than the interval P1 between the first bumps 47 or the interval P2*a* between the second bumps 57 may be set different from the interval P1 between the first bumps 47. Both interval P2*a* and interval P2*b* between the second bumps 57 may be set different from the interval P1 between the first bumps 47.

Furthermore, one of the interval and the slope angle may be set different. The slope angle of the lateral face 47a is an angle between a plane orthogonal to the axis of the second signal pin 35a and the lateral face 47a. The slope angle of the ridge line R2 is an angle between the plane orthogonal to the axis of the second signal pin 35a and the ridge line R2.

Note that the tops S and ridge lines R2 of the second bumps 57 may be configured to be brought into contact with not only the lateral faces 47a, but also the ridge lines R1 of the first bumps 47. Contrary to the above configuration, by designating one group of bumps as the second bumps 57 with the other group of bumps being designated as the first bumps 47, the tops and ridge lines R1 of the first bumps 47 may be configured to be brought into contact with the lateral faces 57b and ridge lines R2 of the second bumps 57.

Also, if the slope angle of the lateral face 47a and the slope angle of the ridge line R2 are varied from each other, any discrepancy between the first contact portion 46 and the second contact portion 55 in a radial direction orthogonal to the axis is permitted and a connection can be made appropriately in spite of the discrepancy. Heights of the first bump 47 and the second bump 57 may be equal to each other, but in the present example, the height of the first bump 47 is set smaller than the height of the second bump 57.

Next, operation of the above configuration will be described. To couple the tool 13 to the arm 11, the mounting surface 12a of the male member 12 is placed facing the mounting surface 14a of the female member 14 by moving the arm 11. Next, the male member 12 is moved toward the female member 14 until the mounting surface 12a abuts the mounting surface 14a and the protrusion 15 is inserted into the coupling hole 16. Subsequently, the male member 12 and the female member 14 are fixed in a coupled state by operating the engagement mechanism. Consequently, the tool 13 is coupled to the arm 11.

In coupling the tool 13 to the arm 11 in the manner described above, with the connection surface 22a of the first signal module 22 opposed to the connection surface 23a of the second signal module 23, the first signal module 22 moves toward the second signal module 23. Consequently, with the first contact portions 46 and the second contact portions 55 opposed to each other, the first signal pins 33a of the first signal relay connector 33 move toward the second signal pins 35a of the second signal relay connector 35.

Before the mounting surface 12a and the mounting surface 14a come into full contact with each other, the first contact portions 46 of the first signal pins 33a abut the corresponding second contact portions 55 of the second signal pins 35a. Note that in the following description, it is assumed for simplicity of explanation that while the pin bodies 41 of the first signal pins 33a rotate with respect to the second signal pins 35a, the pin bodies 41 do not move in the axial direction against a biasing force of a spring in the sleeve 42. Also, when the pin body 41 rotates by a turning force produced by a pressing force of the second signal pin 35a, actually the second signal pin 35a also rotates as a result of reaction to the pressing force, but it is assumed for simplicity of explanation that the pin body 41 rotates with reference to the second signal pin 35a.

When attention is focused on a pair of the first signal pin 33a and the second signal pin 35a, in an initial stage of contact in which the first contact portion 46 and the second contact portion 55 start coming into contact with each other, the tops S of, for example, two or three second bumps 57 abut the lateral faces 47a of the first bumps 47. Regarding timing of abutment, all the tops S may abut the lateral faces 47a simultaneously or at different times. Also, since the interval P1 between the first bumps 47 of the first contact portion 46 and interval P2b between the second bumps 57 of the second contact portion 55 are set different from each other, different tops S abut the lateral faces 47a of different first bumps 47.

Note that timing of abutment between the tops S and the lateral faces 47a, the number of abutting pairs, and specifics of abutment counterparts (which first bumps 47) depend on rotation of the pin body 41 relative to the second signal pin 35a, assembly errors of the first contact portion 46 and the second contact portion 55 in a radial direction, and the like.

Figure 7:
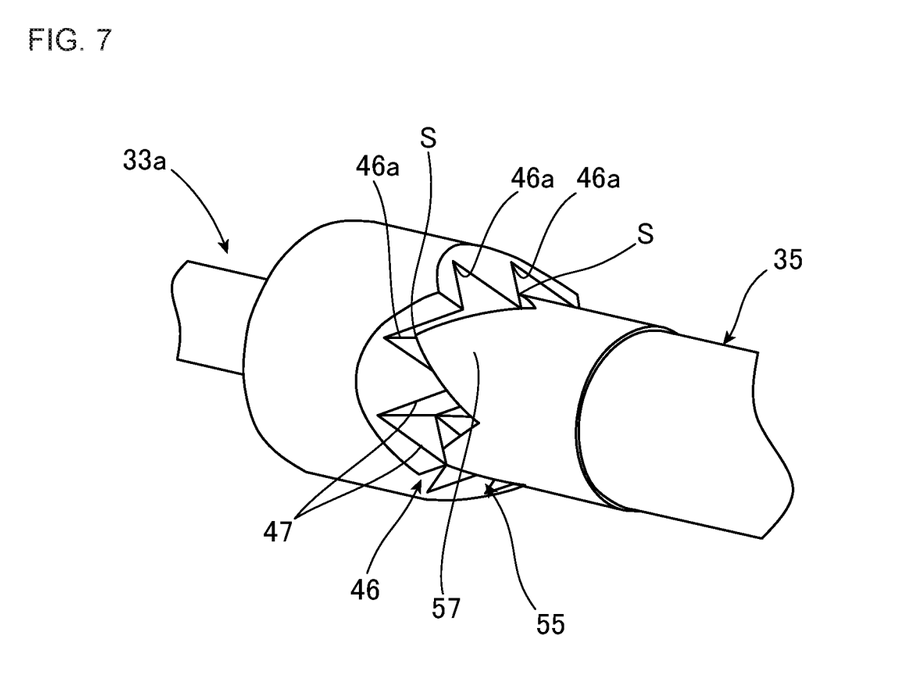
FIG. 7 is a perspective view showing an example of how the first signal pin and second signal pin are connected.

As the abutting tops S press the lateral faces 47a along with movement of the arm 11, a resultant force acts on the pin body 41 according to orientation of the lateral faces 47a pressed by the tops S and positions on the lateral faces 47a, causing the pin body 41 to rotate. Then, when the turning forces caused by the pressing tops S counteract one another, the pin body 41 stops rotating. As the pin body 41 rotates in this way, contact positions of the tops S with the lateral faces 47a move toward bases of the first bumps 47 by moving on the lateral faces 47a in a direction opposite the rotation of the pin body 41. Consequently, the second bumps 57 enter the grooves 46a. The second bumps 57 whose tops S are out of contact with the lateral faces 47a enter the grooves 46a by remaining out of contact. Then, when the turning forces produced by the tops S pressing against the lateral faces 47a counteract one another, the pin body 41 stops rotating. Consequently, as shown in FIG. 7, the four second bumps 57 enter a final connected state with their tops S placed in the grooves 46a. In so doing, of the eight grooves 46a around the first contact portion 46, the four grooves 46a entered by the second bumps 57 are those which do not adjoin each other in the row direction and column direction.

However, when the tops S of the second bumps 57 come into contact with the lateral faces 47a as described above, the directions of the grooves 46a entered by the second bumps 57 i.e., the directions of the bases of the lateral faces 47a forming the grooves 46a, are not parallel to the ridge lines R2 of the second bumps 57 entering the grooves 46a. Also, from the perspective of machining accuracy and the like, the parts to be formed into the ridge lines R2 near the tops S are formed into curved surfaces or the like. Consequently, the lateral faces 47a are put in contact with the tops S of the second bumps 57 as well as with the ridge lines R2 near the tops S. Thus, portions of the ridge lines R2 in contact with the lateral faces 47a press the lateral faces 47a together with the tops S and move on the lateral faces 47a.

When the pin body 41 stops rotating relative to the second signal pin 35a, the pressing forces of the tops S and the ridge lines R2 act only in the axial direction of the pin body 41 along with movement of the arm 11. Consequently, the pin body 41 moves in such a direction as to retract into the sleeve 42 against the bias of the spring in the sleeve 42. Before the head 44 reaches the sleeve 42, the arm 11 moves to a position where the arm 11 is coupled to the tool 13. Consequently, even after the arm 11 and tool 13 are coupled together, the contact of the tops S and ridge lines R2 of the second bumps 57 with the first bumps 47 is maintained by the bias of the spring. Note that even when such pressing forces act, the tops S of the second bumps 57 and the ridge lines R2 in the vicinity thereof may move slightly on one of the lateral faces 47a which form the groove 46a.

When the arm 11 and tool 13 are coupled together as described above, the first signal pins 33a of the first signal relay connector 33 and the second signal pins 35a of the second signal relay connector 35 are connected with each other.

When the first signal relay connector 33 and second signal relay connector 35 are connected with each other as described above, the control apparatus 18 and the servomotor unit 13a are connected electrically via the cable C1, the first circuit side signal connector 31, the first signal relay connector 33, the second signal relay connector 35, the second circuit side signal connector 37, and the cable C3. Consequently, a signal path is formed between the control apparatus 18 and the servomotor unit 13a, allowing signals to be exchanged between circuits in the control apparatus 18 and the servomotor unit 13a.

On the other hand, the first power relay connector 34 moves toward the second power relay connector 36 and the power pins 34a and power pins 36a of the two connectors get connected. As the first power relay connector 34 and the second power relay connector 36 are connected with each other, electric power from the power supply apparatus 19 is supplied to the servomotor unit 13a of the tool 13 via the cable C2, the power input connector 32, the first power relay connector 34, the second power relay connector 36, the power output connector 38, and the cable C4.

For example, when the control apparatus 18 confirms that the tool 13 has been coupled to the arm 11 and that the servomotor unit 13a has been connected, an operation using the tool 13 is started. During the operation, signals are exchanged between circuits in the control apparatus 18 and the servomotor unit 13a via the first signal pins 33a and the second signal pins 35a.

Here, between the first signal pins 33a and the second signal pins 35a, not only the tops S, but also the ridge lines R2 of the second bumps 57 are kept in contact with the lateral faces 47a of the first bumps 47 as described above, increasing the contact area compared to when the tops S are placed in contact with the counterpart signal pins in dots. That is, the first signal pins 33a and the second signal pins 35a are connected under a low electrical resistance condition, maintaining a good connection. Thus, signals are exchanged properly between circuits.

To decouple the tool 13 from the arm 11, the tool 13 coupled to the arm 11 is moved to a predetermined position, and the engagement mechanism is deactivated. Subsequently, the arm 11 is moved in such a direction as to move the male member 12 from the female member 14. Consequently, the tool 13 is separated from the arm 11. In so doing, since the first signal pins 33a move in such a direction away from the second signal pins 35a along with movement of the arm 11, the first contact portions 46 move away from the second contact portions 55, breaking the electrical connection between the first signal pins 33a and the second signal pins 35a.

However, when coupling and decoupling between the arm 11 and the tool 13 are repeated, the tops S of the second bumps 57 abut the lateral faces 47a of the first bumps 47 and move on the lateral faces 47a, rubbing against the lateral faces 47a and resulting in wear and deformation. Regarding the portions of the ridge lines R2 near the tops S, when the first signal pins 33a and the second signal pins 35a are connected with each other, the ridge lines R2 move along the lateral faces 47a by remaining in contact with the lateral faces 47a, and thus rubbing against the lateral faces 47a occurs.

When wear and deformation occur on the tops S in this way, the manner in which the second bumps 57 contact the lateral faces 47a changes, and consequently new contact surfaces for the lateral faces 47a are formed on the ridge lines R2. As a result, even if the tops S are worn and deformed, the contact area between the first signal pins 33a and the second signal pins 35a is maintained or increased. Thus, a good connection is maintained without increases in electrical resistance.

Also, when the tool 13 is not coupled to the arm 11 or when the tool 13 is decoupled from the arm 11, if, for example, another industrial robot is operating using a spot welding gun, weld spatter may scatter and stick to the first signal pins 33a of the first signal relay connector 33 or the second signal pins 35a of the second signal relay connector 35.

However, when the first signal pins 33a and the second signal pins 35a are connected with each other as described above, rubbing occurs between the lateral faces 47a of the first bumps 47 and the tops S and ridge lines R2 of the second bumps 57. Consequently, the spatter sticking, for example, to the lateral faces 47a are pushed aside or rubbed off by the tops S or the ridge lines R2. Also, any spatter sticking to the tops S and the ridge lines R2 is rubbed off by rubbing with the lateral faces 47a. Thus, the first signal pins 33a and the second signal pins 35a make positive contact with each other and a good connection is maintained with low electrical resistance. This is also true when there is adhesion of contamination other than spatter or when an oxide film is formed, and a good connection is maintained.

Note that a phenomenon can occur in which the first signal pin 33a and the second signal pin 35a are connected with each other even if a turning force is not produced by the tops S pressing against the lateral faces 47a, i.e., even if the tops S of the second bumps 57 and the ridge lines R2 in the vicinity thereof do not move on the lateral faces 47a along with rotation of the pin body 41. Such a phenomenon occurs when the position of the first contact portion 46 relative to the second contact portion 55 in a rotation direction of the pin body 41 do not change from the time of previous decoupling or when axes of the first signal pin 33a and the second signal pin 35a coincide completely and the first contact portion 46 is located at a specific position relative to the second contact portion 55 in a rotation direction of the pin body 41. However, such phenomena are a rare occurrence, and do not occur successively even if they occur. This is because the first signal pins 33a rotate relative to the second signal pins 35a due to vibrations resulting from coupling and decoupling of the arm 11 and the tool 13 or because there is axial displacement between the first signal pins 33a and the second signal pins 35a due to assembly errors of the first signal relay connector 33 and the second signal relay connector 35. Thus, the first signal pins 33a and the second signal pins 35a make positive contact with each other and a good connection is maintained with low electrical resistance.

The configurations of the first and second contact portions 46 and 55 described above are exemplary, and the arrangements of bumps, array pitches, and intervals and combinations thereof on the first and second contact portions 46 and 55 as well as the shapes and numbers of the first and second bumps 47 and 57 and combinations of the numbers can be determined as appropriate. For example, the first and second bumps 47 and 57 may have any of various conical/pyramidal shapes, i.e., pyramidal shapes, such as a triangular pyramid and pentagonal pyramid, and conical shapes. Also, the first bumps 47 and the second bumps 57 may have curved lateral faces and ridge lines. Furthermore, intervals (array pitches) between the bumps on the first and second contact portions 46 and 55 may not be constant and may change according to locations of the bumps. In that case, either contact portions whose interval changes may be combined or contact portions whose interval is constant and contact portions whose interval changes may be combined.

Whereas in the example described above, a connector apparatus is used for a tool changer, the present invention is not limited to this, and may be used as a connector apparatus to connect and disconnect signal lines with other equipment, circuitry, and the like regardless of whether or not coupling and decoupling is done. Of course, the male member 12 and the female member 14 may be provided with the first connector and the second connector.

[Verification testing] Changes in the electrical resistance of the first signal pin 33a and the second signal pin 35a configured as described above were tested in a connected state. Verification testing was conducted by setting the first signal pin 33a and the second signal pin 35a on a testing device and connecting and disconnecting the first signal pin 33a and the second signal pin 35a repeatedly. Regarding electrical resistance, resistance values between the first signal pin 33a and the second signal pin 35a were measured with the first signal pin 33a and the second signal pin 35a placed in contact. The first signal pin 33a used was as follows: the interval P1 between the first bumps 47 was 0.60 mm, the slope angle of the lateral face 47a was 60°, and the diameter of the head 44 was 2.00 mm. The second signal pin 35a used was as follows: the interval P2a between the second bumps 57 was 1.0 mm, the interval P2b between the second bumps 57 across the center was 1.42 mm, the slope angle of the ridge line R2 was 50.77°, and the diameter of the lower part of the head 52 was 1.42 mm. The material of the first signal pin 33a and the second signal pin 35a was beryllium copper and the surfaces of the first signal pin 33a and the second signal pin 35a were plated with gold.

The testing device was a reciprocating contact testing device, the first signal pin 33a and the second signal pin 35a were connected and disconnected under conditions of uniform displacement, and contact resistance was measured in each reciprocation shown in Table 1 below. The first signal pin 33a and the second signal pin 35a were tested using ten sets of samples (No. 1 to No. 10). In the verification testing, the state in which the first signal pin 33a and the second signal pin 35a were placed in contact as shown in FIG. 7 was designated as a first state, the state in which the first signal pin 33a of the pin body 41 was depressed by 2.5 mm from the first state against the bias of the spring was designated as a second state, and the first signal pin 33a and the second signal pin 35a were moved relative to each other such that the pins would move between the first state and the second state. The contact resistance was measured in each of the first state and the second state. Table 1 below shows results of the verification testing for contact resistance. The number of times in Table 1 means the number of reciprocations. Also, "Forward" attached to sample numbers indicates a contact resistance value measured in the second state and "Backward" indicates a contact resistance value measured in the first state. This also applies to Table 2 below.

TABLE 1

| | | NUMBER OF TIMES (TEN-THOUSAND TIMES) | | | | | |
|---|---|---|---|---|---|---|---|
| | | 0 | 10 | 30 | 50 | 75 | 100 |
| RESISTANCE (mΩ) | No. 1 FORWARD | 23.36 | 31.70 | 15.51 | 31.70 | 25.66 | 24.37 |
| | No. 1 BACKWARD | 22.84 | 36.51 | 16.37 | 33.72 | 24.74 | 24.66 |
| | No. 2 FORWARD | 21.04 | 18.00 | 18.03 | 18.28 | 17.91 | 18.68 |
| | No. 2 BACKWARD | 20.94 | 17.97 | 18.27 | 18.43 | 18.11 | 18.75 |
| | No. 3 FORWARD | 18.92 | 17.53 | 16.90 | 18.25 | 17.01 | 18.89 |
| | No. 3 BACKWARD | 18.82 | 17.96 | 18.04 | 18.64 | 17.33 | 18.07 |
| | No. 4 FORWARD | 23.43 | 17.14 | 18.93 | 17.66 | 17.60 | 20.59 |
| | No. 4 BACKWARD | 23.31 | 17.15 | 18.59 | 17.83 | 17.70 | 20.32 |
| | No. 5 FORWARD | 20.40 | 18.01 | 20.50 | 17.47 | 18.66 | 19.30 |
| | No. 5 BACKWARD | 20.06 | 18.30 | 19.38 | 17.49 | 18.71 | 19.44 |
| | No. 6 FORWARD | 19.78 | 18.41 | 21.25 | 22.07 | 22.44 | 23.02 |
| | No. 6 BACKWARD | 19.66 | 18.48 | 21.26 | 25.25 | 22.09 | 23.56 |
| | No. 7 FORWARD | 20.30 | 22.62 | 15.37 | 25.61 | 18.16 | 17.80 |
| | No. 7 BACKWARD | 20.03 | 22.42 | 15.47 | 23.41 | 18.16 | 17.93 |
| | No. 8 FORWARD | 21.69 | 18.29 | 14.43 | 18.21 | 19.47 | 17.24 |
| | No. 8 BACKWARD | 21.13 | 18.24 | 14.59 | 19.67 | 19.33 | 17.41 |
| | No. 9 FORWARD | 18.92 | 17.41 | 16.62 | 25.83 | 17.82 | 19.11 |
| | No. 9 BACKWARD | 18.93 | 17.64 | 17.04 | 24.66 | 17.85 | 18.88 |
| | No. 10 FORWARD | 18.69 | 16.01 | 16.63 | 21.73 | 17.13 | 17.71 |
| | No. 10 BACKWARD | 18.39 | 16.69 | 16.72 | 24.03 | 17.15 | 18.64 |
| | RESISTANCE AVERAGE (FORWARD) | 20.65 | 19.51 | 17.42 | 21.68 | 19.19 | 19.67 |
| | RESISTANCE AVERAGE (BACKWARD) | 20.41 | 20.14 | 17.57 | 22.31 | 19.12 | 19.77 |

Figure 8:
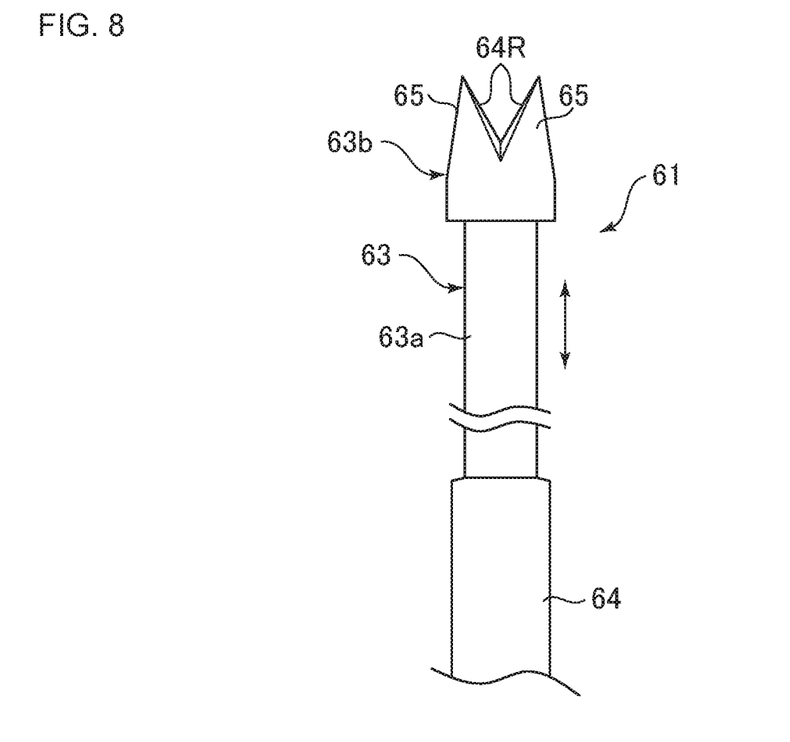
FIG. 8 is a plan view showing a comparison sample, which is a signal pin having four bumps.
Figure 9:
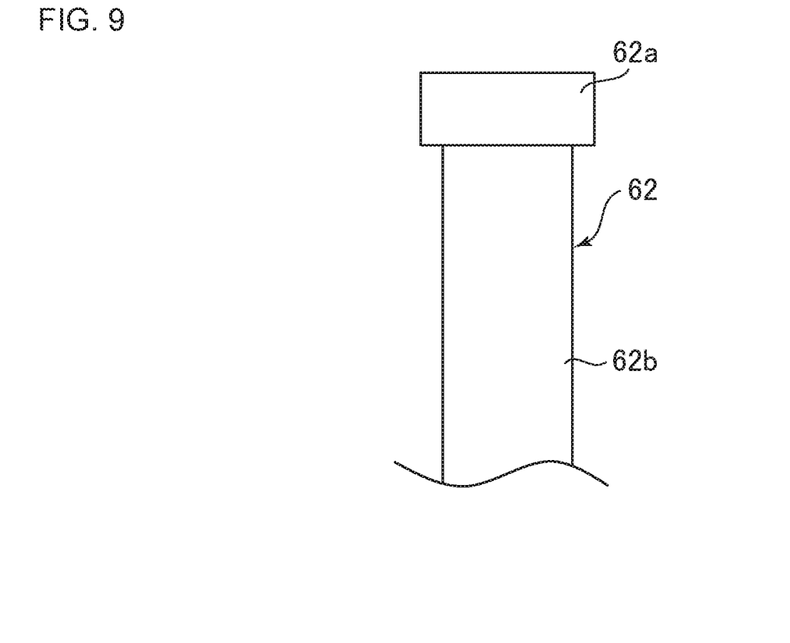
FIG. 9 is a plan view showing a comparison sample, which is a signal pin having a flat front end face.

Also, for comparison's sake, comparison samples (No. 1 to No. 10) each made up of a combination of the signal pin 61 shown in FIG. 8 and the signal pin 62 shown in FIG. 9 were tested for connection and disconnection. The signal pin 61 was provided with a pin body 63 and a sleeve 64, was fitted in the sleeve 64, making the pin body 63 movable along the axial direction and pivotable on the axis as with the first signal pin 33a, and was biased by a spring (not shown) in the sleeve 64. The pin body 63 had a head 63b on one end of a shank 63a, where four bumps 65 similar in shape to those of the second signal pin 35a were formed on the front end face of the head 63b. The interval between the tops of a pair of circumferentially adjacent bumps 65 was 1.08 mm, the slope angle θ2 of the ridge line 64R was 60°, and the diameter of the lower part of the head 63b was 1.50 mm. Also, the signal pin 62 had a disk portion 62a on a front end of a shank 62b. The disk portion 62a was provided with a flat end face and was 2.4 mm in diameter and 1 mm in thickness. The signal pins 61 and 62 were made of the same material as the first signal pin 33a and the second signal pin 35a and the surfaces of the signal pins 61 and 62 were plated with gold. Table 2 below shows results of the verification testing conducted under the same conditions as the first signal pin 33a and the second signal pin 35a.

TABLE 2

| | | NUMBER OF TIMES (TEN-THOUSAND TIMES) | | | | | |
|---|---|---|---|---|---|---|---|
| | | 0 | 10 | 30 | 50 | 75 | 100 |
| RESISTANCE (mΩ) | No. 1 FORWARD | 34.02 | 41.36 | 55.97 | 48.19 | 42.56 | 46.34 |
| | No. 1 BACKWARD | 34.50 | 46.62 | 55.70 | 45.59 | 40.30 | 42.32 |
| | No. 2 FORWARD | 51.46 | 52.32 | 49.35 | 64.07 | 60.93 | 45.44 |
| | No. 2 BACKWARD | 53.08 | 49.86 | 50.63 | 64.67 | 55.13 | 59.38 |
| | No. 3 FORWARD | 56.46 | 46.88 | 54.09 | 69.91 | 40.24 | 54.34 |
| | No. 3 BACKWARD | 54.27 | 42.78 | 53.08 | 50.53 | 41.79 | 66.03 |
| | No. 4 FORWARD | 43.31 | 53.62 | 52.32 | 43.72 | 72.22 | 41.87 |
| | No. 4 BACKWARD | 44.01 | 53.22 | 55.63 | 44.10 | 71.47 | 45.20 |
| | No. 5 FORWARD | 116.26 | 59.64 | 74.76 | 122.51 | 72.64 | 57.83 |
| | No. 5 BACKWARD | 116.35 | 57.03 | 88.96 | 62.84 | 51.14 | 54.92 |
| | No. 6 FORWARD | 55.03 | 73.88 | 51.93 | 145.63 | 44.32 | 54.34 |
| | No. 6 BACKWARD | 54.56 | 71.21 | 50.94 | 165.47 | 40.26 | 53.54 |
| | No. 7 FORWARD | 39.24 | 48.58 | 41.43 | 47.95 | 53.97 | 47.65 |
| | No. 7 BACKWARD | 40.16 | 49.24 | 43.92 | 45.77 | 55.02 | 54.12 |
| | No. 8 FORWARD | 44.17 | 39.49 | 39.78 | 48.55 | 88.14 | 55.56 |
| | No. 8 BACKWARD | 43.86 | 39.15 | 41.33 | 45.36 | 115.72 | 55.60 |
| | No. 9 FORWARD | 47.57 | 47.26 | 52.16 | 40.58 | 55.87 | 64.12 |
| | No. 9 BACKWARD | 43.89 | 48.39 | 54.17 | 41.54 | 56.50 | 82.63 |
| | No. 10 FORWARD | 41.77 | 62.95 | 62.39 | 70.17 | 70.39 | 56.94 |
| | No. 10 BACKWARD | 40.63 | 61.16 | 61.63 | 77.44 | 72.49 | 45.71 |
| | RESISTANCE AVERAGE (FORWARD) | 52.93 | 52.60 | 53.42 | 70.13 | 60.13 | 52.44 |
| | RESISTANCE AVERAGE (BACKWARD) | 52.53 | 51.87 | 55.60 | 64.33 | 59.98 | 55.95 |

As can be seen from Table 1, with the combination of the first signal pin 33a and the second signal pin 35a according to the present invention, the resistance values were lower than the comparison samples in the initial state, and although some variations were observed in the resistance values with increases in the number of times of connection/disconnection, the resistance values remained low. In contrast, with the comparison samples, the resistance values showed a tendency to increase with increases in the number of times of connection/disconnection, and some comparison samples showed large variations in the resistance values.

What is claimed is:

1. A connector apparatus comprising a first connector having a first signal pin and a second connector having a second signal pin, the connector apparatus electrically connecting the first connector and the second connector by bringing tips of the first signal pin and the second signal pin into contact with each other, wherein:
the first signal pin has a first contact portion on a front end face, the first contact portion being made up of a plurality of mountain-shaped first bumps arranged two-dimensionally;
the second signal pin has a second contact portion on a front end face, the second contact portion being made up of a plurality of mountain-shaped second bumps arranged two-dimensionally; and
at least one of the first signal pin and the second signal pin is pivotable on an axis; and sloped portions of at least one of the first bumps and the second bumps come into contact with either or both of tops and ridge lines of the other of the first bumps and the second bumps.

2. The connector apparatus according to claim 1, wherein the sloped portions of either of the first bumps and the second bumps are lateral faces of the bumps.

3. The connector apparatus according to claim 1, wherein an interval between a pair of the second bumps in the second contact portion and an interval between adjacent bumps of the first bumps in the first contact portion differ from each other.

4. The connector apparatus according to claim 1, wherein a slope angle of the sloped portions of the first bumps and a slope angle of the sloped portions of the second bumps differ from each other.

5. The connector apparatus according to claim 1, wherein the first contact portion includes a plurality of the first bumps having a square pyramidal shape and arranged in a 3-row by 3-column matrix, and the second contact portion includes four of the second bumps provided with ridge lines extending from tops arranged on a circumference toward a center of a front end face.

* * * * *